United States Patent [19]
Kido et al.

[11] Patent Number: 4,683,455
[45] Date of Patent: Jul. 28, 1987

[54] SHIFTING TIMING INDICATING SYSTEM FOR A VEHICLE

[75] Inventors: Yoshinobu Kido; Toshihiro Yamada, both of Hiroshima, Japan

[73] Assignee: Mazda Motor Corporation, Japan

[21] Appl. No.: 750,511

[22] Filed: Jul. 1, 1985

[30] Foreign Application Priority Data

Jul. 4, 1984 [JP] Japan .................................. 59-138577

[51] Int. Cl.$^4$ .......................... B60Q 1/00; G08B 9/04
[52] U.S. Cl. ................................... 340/52 R; 340/520; 340/62; 74/DIG. 7; 434/71; 180/282; 364/431.07
[58] Field of Search ..................... 340/52 R, 52 D, 62; 74/DIG. 7, 336 R, 855; 200/61.88; 180/170, 171, 282; 364/424.1, 431.07, 442, 550, 565; 434/71; 368/5, 6; 324/391; 73/116

[56] References Cited

U.S. PATENT DOCUMENTS 4,267,545  5/1981  Drone et al. ...................... 340/52 R
4,438,423  3/1984  Stier .................................. 340/52 R
4,555,691 11/1985  Hosaka et al. ..................... 340/52 R

FOREIGN PATENT DOCUMENTS 0037356  3/1983  Japan ................................. 340/52 R
17046    4/1983  Japan .

Primary Examiner—Donnie L. Crosland
Attorney, Agent, or Firm—Gerald J. Ferguson, Jr.; Michael P. Hoffman; Ronni S. Malamud

[57] ABSTRACT

A shifting timing indicating system for a vehicle includes a control circuit having an engine rpm sensor for detecting the engine rpm and a rpm comparator which receives the output of the engine rpm sensor and determines whether the engine rpm exceeds a preset value. The control circuit outputs a shift-up signal when the engine rpm exceeds the preset value. A shift-up indicator receives the shift-up signal from the control circuit and makes a shift-up display to direct the operator of the vehicle to shift up. An acceleration detecting circuit detects the rate of increase in engine load and the shift-up indicator is inhibited from making the shift-up display for a predetermined time interval which is extended with increase in the rate of increase in engine load.

11 Claims, 8 Drawing Figures

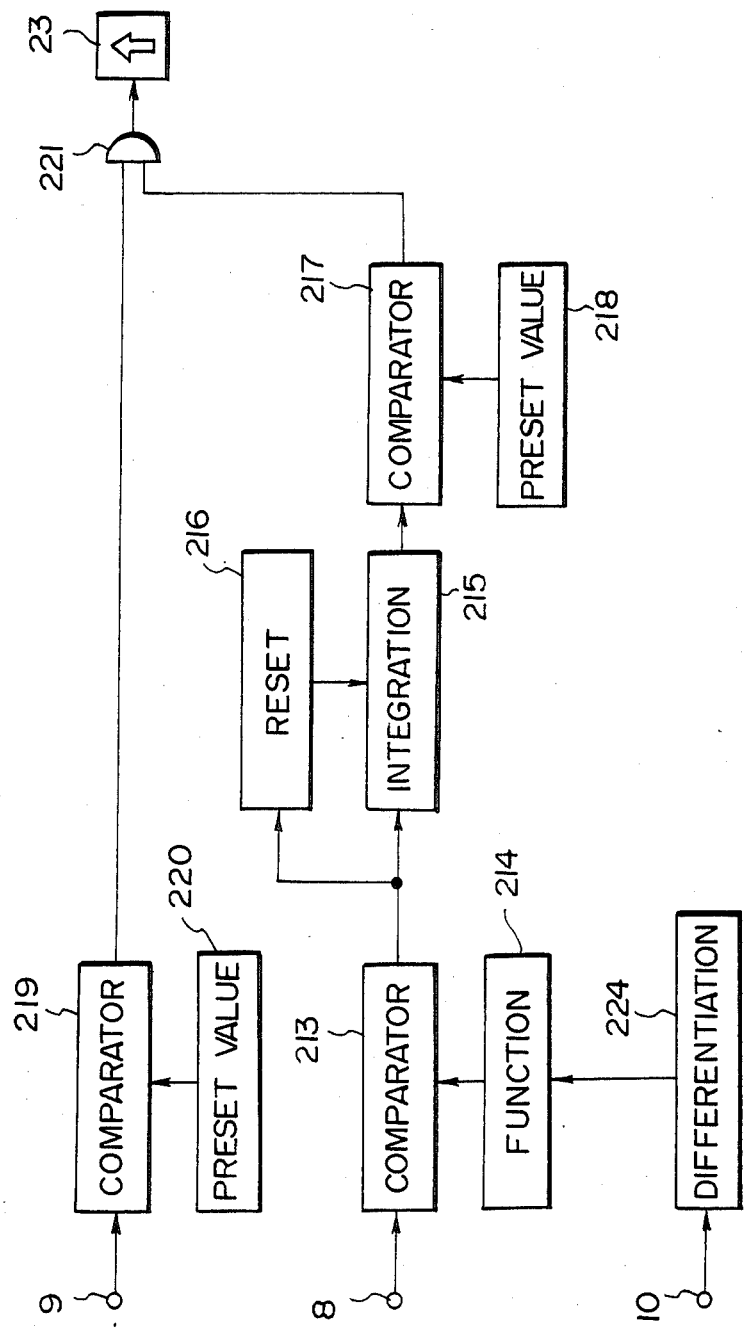

SHIFTING TIMING INDICATING SYSTEM FOR A VEHICLE

BACKGROUND OF THE INVENTION

1. Field of the Invention

This invention relates to a shifting timing indicating system for a vehicle for indicating timings for shifting.

2. Description of the Prior Art

Recently, vehicles are provided with various monitors for indicating running information, optimal operating conditions, and the like. For example, a shifting timing indicating system for a vehicle is disclosed in Japanese Patent Publication 58(1983)-17046. For instance, the vehicle may travel at 40 Km/h with the transmission in either second or third. However, in view of the fact that the engine rpm is lower in third gear than in second gear and accordingly mechanical loss of engine output power due to sliding resistance and the like is less in third gear than second gear and the fact that pumping loss of engine output power is less when the amount of depression of the accelerator pedal is larger, the shifting timing indicating system compares detected engine rpm and engine load with reference values and directs the operator to shift up into third, thereby improving fuel economy.

However, since the shifting timing indicating system of the Japanese patent publication is arranged to direct the operator to shift up by simply comparing the detected engine rpm and engine load with the reference values, a shift-up display directing the operator to shift up may be made even during acceleration depending on the operating condition, thereby giving the operator a strange impression. That is, though the shift-up display is not made during acceleration substantially at full throttle under heavy load even if the engine rpm exceeds the reference value, the shift-up display is made before or during acceleration under light to middle load. Thus, the shift-up display will sometimes be made in the case that the transmission should be shifted down or held where it is, which gives the operator a strange impression.

SUMMARY OF THE INVENTION

In view of the foregoing observations and description, the primary object of the present invention is to provide a shifting timing indicating system for a vehicle which assists the operator of the vehicle in operating the vehicle at a low fuel consumption during steady traveling without giving him a strange impression during acceleration.

The shifting timing indicating system in accordance with the present invention includes a control means having an engine rpm detecting means for detecting the engine rpm and a rpm determination means which receives the output of the engine rpm detecting means and determines that the engine rpm exceeds a preset value. The control means outputs a shift-up signal when the engine rpm exceeds the preset value. A shift-up indicating means receives the shift-up signal from the control means and makes a shift-up indication to direct the operator of the vehicle to shift up. An acceleration detecting means detects the rate of increase in engine load and a restricting means inhibits the shift-up indicating means from making the shift-up indication for a predetermined time interval which is extended with increase in the rate of increase in engine load.

BRIEF DESCRIPTION OF THE DRAWINGS

FIG. 8 is a view similar to FIG. 2 but showing a shift-up indication control circuit in accordance with still another embodiment of the present invention.

DESCRIPTION OF THE PREFERRED EMBODIMENTS

Figure 1:
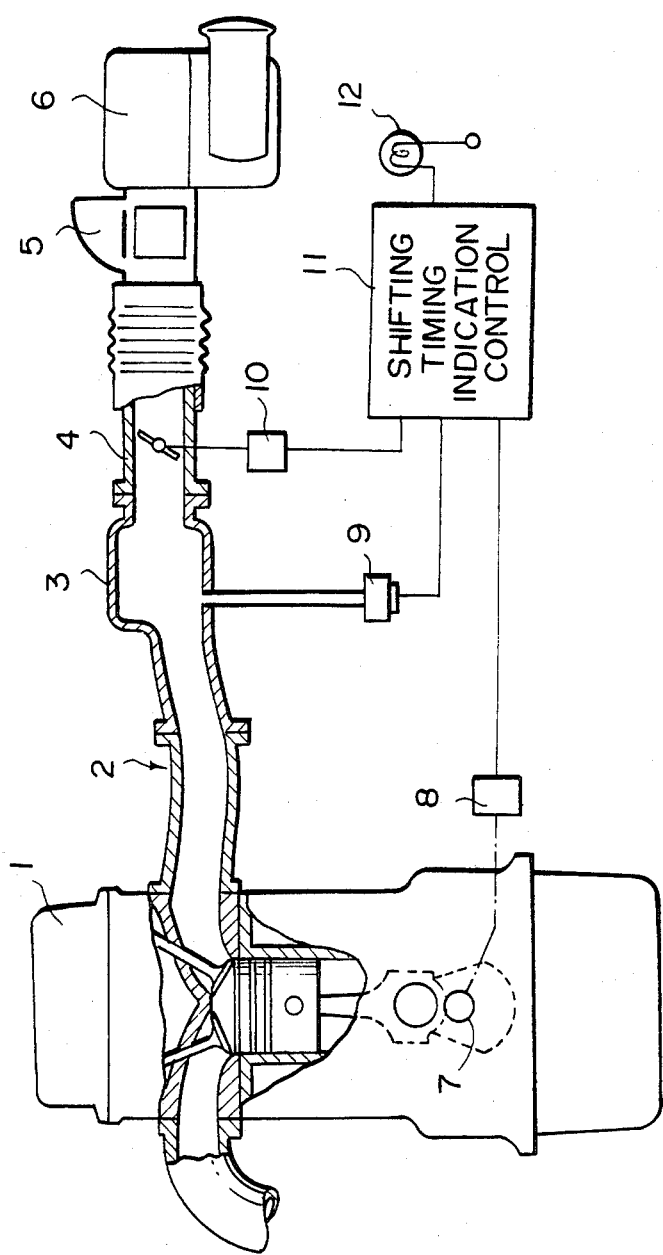
FIG. 1 is a schematic view showing an internal combustion engine provided with a shifting timing indicating system in accordance with an embodiment of the present invention.
Figure 2:
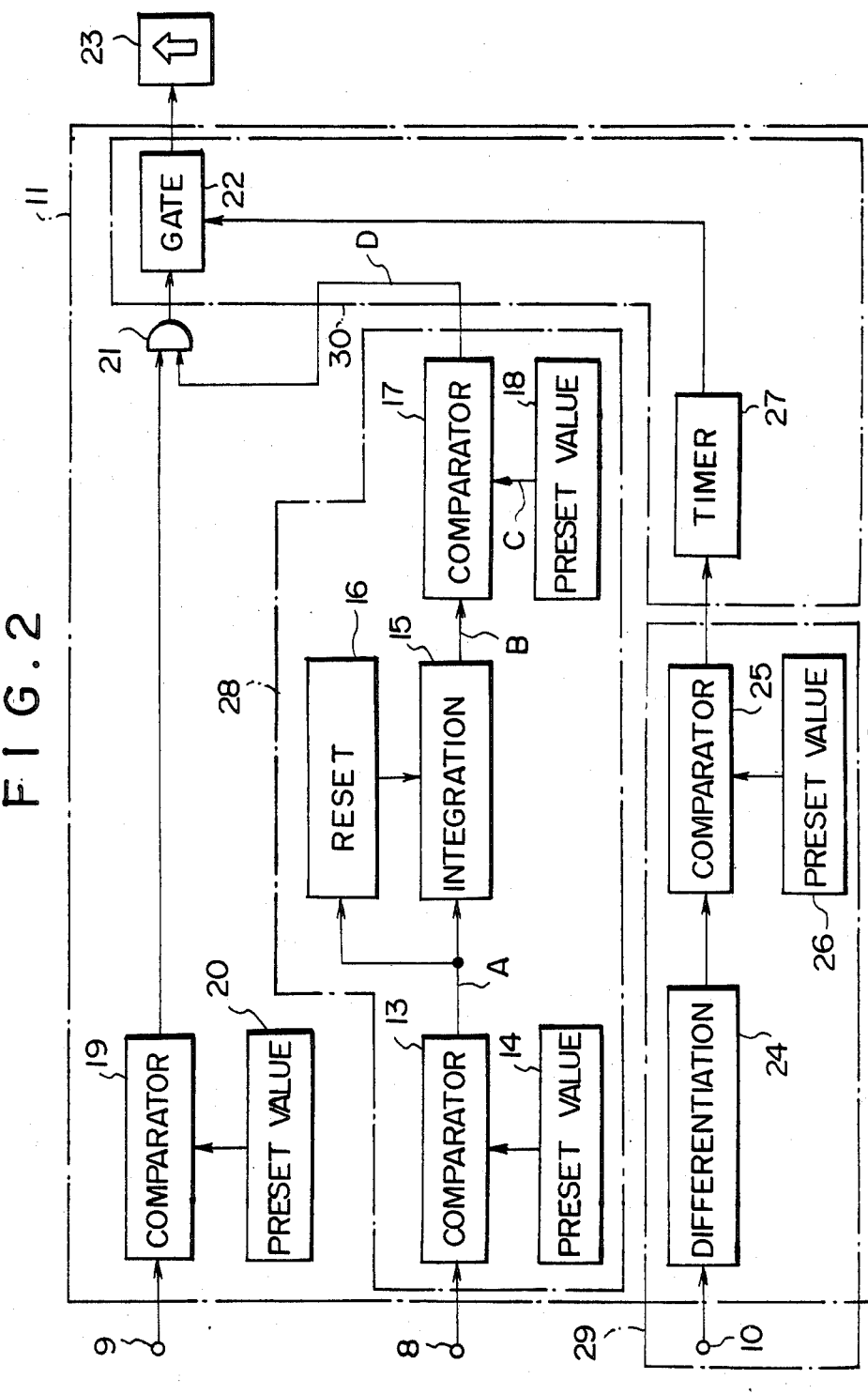
FIG. 2 is a block diagram of the shifting timing indication control circuit employed in the embodiment of FIG. 1.

In FIG. 1, an internal combustion engine 1 provided with a shifting timing indicating system in accordance with an embodiment of the present invention has an intake passage 2. An air cleaner 6 is mounted on the upstream end of the intake passage 2 and a surge tank 3 is provided at an intermediate portion of the intake passage 2. A throttle valve 4 and an airflow sensor 5 are disposed in the intake passage 2 between the surge tank 3 and the air cleaner 6. An engine rpm detecting means 8 is disposed with respect to the crankshaft 7 of the engine 1 to detect the engine rpm through the rpm of the crankshaft 7, and a pressure transducer 9 is provided with respect to the surge tank 3 to detect the intake vacuum downstream of the throttle valve 4 which is a parameter of engine load. Further, a throttle opening degree detecting device 10 is provided to detect the opening degree of the throttle valve 4. As shown in FIG. 2, the outputs of the engine rpm detecting means 8, the pressure transducer 9 and the throttle opening degree detecting device 10 are input into a shifting timing indication control circuit 11. The shifting timing indication control circuit 11 controls a shift indicator light 12 according to the outputs of the engine rpm detecting means 8, the pressure transducer 9 and the throttle opening degree detecting device 10 as will be described in detail, hereinbelow.

The shifting timing indication control circuit 11 includes a rpm comparator 13 for comparing the output of the engine rpm detecting means 8 with the output of a preset value generator 14, an integration circuit 15 for integrating the output (A) of the rpm comparator 13, a reset circuit 16 for resetting the integration circuit 15 when the output (A) of the rpm comparator 13 turns to "L", an integration value comparator 17 for comparing the output (B) of the integration circuit 15 with the output (C) of a preset value generator 18, an intake vacuum comparator 19 for comparing the output of the pressure transducer 9 with the output of a preset value generator 20, an AND circuit 21 into which the outputs of the integration value comparator 17 and the intake vacuum comparator 19 are input, a gate circuit 22 which selectively permits or inhibits the output of the AND circuit 21 to pass therethrough according to the level, i.e., "H" or "L", of a gate control signal, and a shift-up indicator 23 having said shift indicator light 12 built therein. The shifting timing indication control circuit 11 further includes a differentiating circuit 24 for differentiating the output of the throttle opening degree detecting device 10, a differentiated value comparator 25 for comparing the output of the differentiating circuit 24 and the output of a preset value generator 26, and a timer circuit 27 which normally delivers an "H" gate control signal to the gate circuit 22 and delivers an "L" gate control signal for a predetermined time when the output of the differentiated value comparator 25 turns to "H".

The comparators 13 and 17, the preset value generators 14 and 18, the integration circuit 15 and the reset circuit 16 constitute a rpm determination means 28 for determining whether or not the engine rpm exceeds a preset rpm. The throttle opening degree detecting device 10, the differentiating circuit 24, the comparator 25 and the preset value generator 26 constitute an acceleration detecting means 29 for detecting acceleration of the engine 1. Further, said timer circuit 27 and the gate circuit 22 constitute a restricting means 30 for restricting the shift-up indicator 23 from making shift-up display during acceleration.

The engine rpm detecting means 8 detects the engine rpm through the rpm of the crankshaft 7 and the detected rpm is compared with the preset value output from the preset value generator 14 by the engine rpm comparator 13. The pressure transducer 9 detects the intake vacuum downstream of the throttle valve 4, and the intake vacuum is compared with the preset value output from the preset value generator 20. The throttle opening degree detecting device 10 detects the opening degree of the throttle valve 4, and the detected opening degree of the throttle valve 4 is compared with the preset value output from the preset value generator 26 by the differentiated value comparator 25 after differentiated by the differentiating circuit 24.

Figure 3:
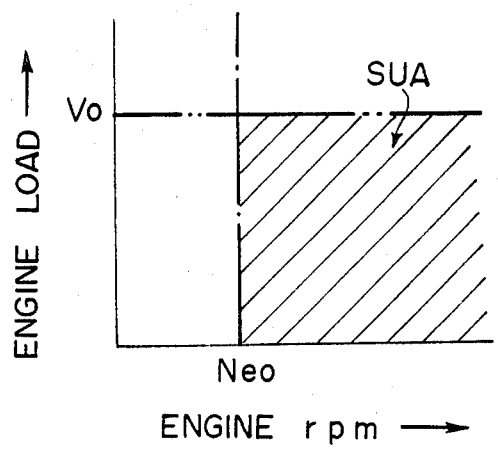
FIG. 3 is a view for illustrating the shift-up indication area employed in the shifting timing indication control circuit of FIG. 2.
Figure 4:
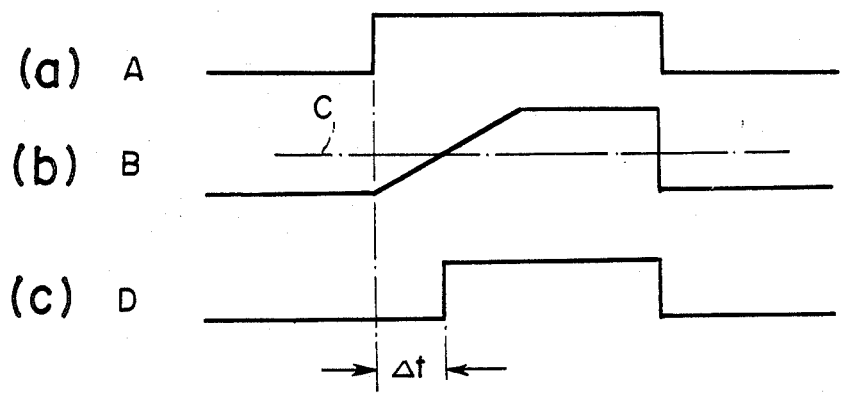
FIG. 4 shows waveforms of the outputs of the rpm comparator, the integration circuit and the integration value comparator.

During steady operation of the engine 1, the output of the differentiating circuit 24 is lower than the preset value and the output of the differentiated value comparator 25 is "L". Accordingly, the gate control signal output from the timer circuit 27 is "H" and the gate circuit 22 opens. When the operating condition of the engine 1 enters shift-up indication area SUA shown in FIG. 3 during steady operation of the engine 1, that is, when the detected intake vacuum becomes lower than the preset value Vo and the detected engine rpm exceeds the preset value Neo (e.g., 1500 rpm), the output (A) of the engine rpm comparator 13 turns to "H" (FIG. 4, line a), and the output (A) of value "H" is integrated by the integration circuit 15. When the integration output B (FIG. 4, line b) exceeds the preset value (C) after a time lag Δt, the output (D) of the integration value comparator 17 turns to "H". The intake vacuum comparator 19 outputs "H" when the detected intake vacuum is lower than the preset value Vo. Accordingly, the output of the AND circuit 21 turns to "H", and the "H" output is delivered to the shift-up indicator 23 to light the shift indicator light 12. When the operating condition of the engine 1 enters the shift-up indication area SUA during steady operation of the engine 1, the shift-up display is thus made to direct the operator to shift up.

When the intake vacuum downstream of the throttle valve 4 is higher than the preset value Vo, the output of the intake vacuum comparator 19 is "L" and the shift-up display is not made even if the detected rpm exceeds the preset value Neo. This is because shift-up is not necessary when the engine 1 operates under heavy load as in ascending a slope, and because the lower gear is advantageous in view of fuel economy when the intake vacuum is higher than the preset value, i.e., the amount of depression of the accelerator pedal is large, since the pumping loss of engine output power is less when the amount of depression of the accelerator pedal is larger.

On the other hand, during acceleration of the engine, the output of the differentiating circuit 24 is larger than the preset value and the integration value comparator outputs "H", whereby the output of the timer circuit 27 or the gate control signal turns to "L" for a predetermined time interval corresponding to said time lag Δt to close the gate circuit 22. Therefore, the output of the AND circuit 21 is not delivered to the shift-up indicator 23 until the predetermined time interval lapses after the operating condition of the engine 1 enters the shift-up indication area SUA. Thus, the shift-up display is not made for a predetermined time interval when the engine 1 is being accelerated.

In the embodiment shown in FIG. 2, the rpm determination means 28 includes a delay circuit comprising an integration circuit so that the shift-up display is made a predetermined time after the operating condition of the engine enters the shift-up indication area SUA. This is advantageous in that hunting of the shift-up indicator light 12 can be prevented when the operating condition of the engine is near the boundary of the shift-up indication area SUA and goes in and out the area SUA.

Figure 5:
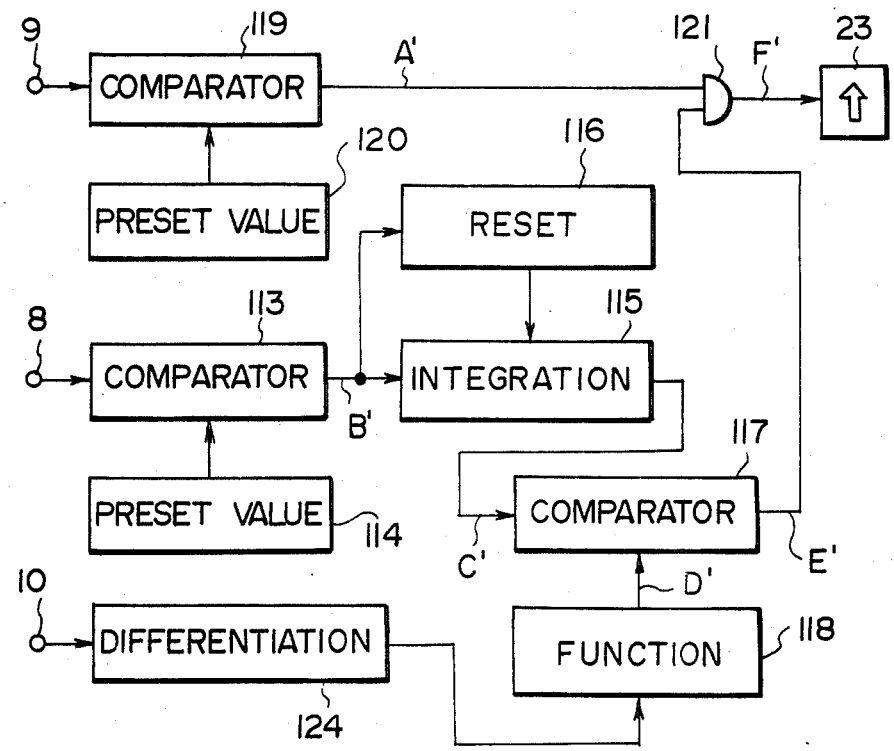
FIG. 5 is a view similar to FIG. 2 but showing a shift-up indication control circuit in accordance with another embodiment of the present invention.

FIG. 5 shows the shifting timing indication control circuit for a shifting timing indicating system in accordance with another embodiment of the present invention in which the shift-up display is restricted by extending the delay time of the delay circuit provided in the rpm determination means when acceleration is initiated.

The shifting timing indication control circuit in accordance with this embodiment includes a rpm comparator 113 for comparing the output of the engine rpm detecting means 8 with the output of a preset value generator 114, an integration circuit 115 for integrating the output (B') of the rpm comparator 113, a reset circuit 116 for resetting the integration circuit 115 when the output (B') of the rpm comparator 113 turns to "L", an integration value comparator 117 for comparing the output (C') of the integration circuit 115 with an output (D') of a function generator 118 which generates a preset value according to the output of an differentiating circuit 124 for differentiating the output of the throttle opening degree detecting means 10, an intake vacuum comparator 119 for comparing the output of the pressure transducer 9 with an output of a preset value generator 120, and an AND circuit 121 into which the outputs (A') and (E') of the integration value comparator 117 and the intake vacuum comparator 119 are input.

Figure 6:
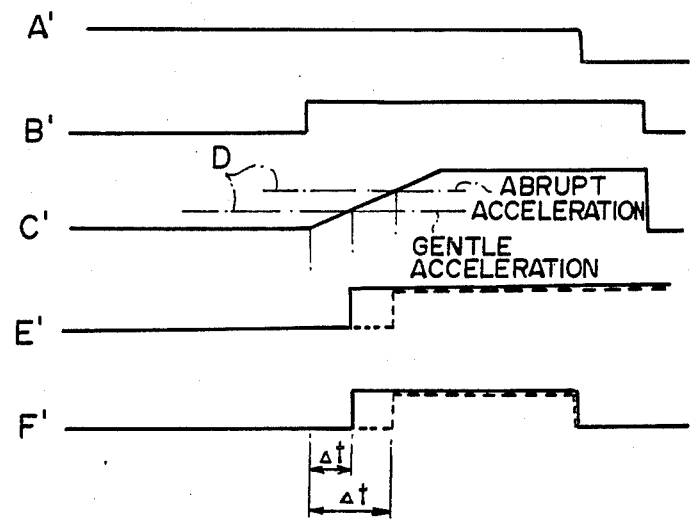
FIG. 6 is a view for illustrating the principle of operation of the shift-up control circuit of FIG. 5 wherein lines A' to F' respectively represent waveforms of the outputs of the intake vacuum comparator, the rpm comparator, the integration circuit, the function generator and the AND circuit.

FIG. 6 is a timing chart of the shifting timing indication control circuit shown in FIG. 5 in which lines A' to F' respectively represents the outputs of the intake vacuum comparator 119, the rpm comparator 113, the integration circuit 115, the function generator 118, the integration value comparator 117 and the AND gate 121. As can be understood from FIG. 6, the preset value with which the integration value (the output C' of the integration circuit 115) is compared, i.e., the output D' of the function generator 118, linearly changes with the degree of acceleration. That is, the abrupter the acceleration is, the larger the preset value is. Thus, the output F' of the AND circuit 121 is kept at "L", after the operating condition enters the shift-up indication area SUA, for a predetermined time interval which becomes longer as the degree of acceleration is increased, whereby the shift-up indicator light 12 is prevented from being energized for a predetermined time interval after the operating condition enters the shift-up area SUA while the engine 1 is being accelerated.

Figure 7:
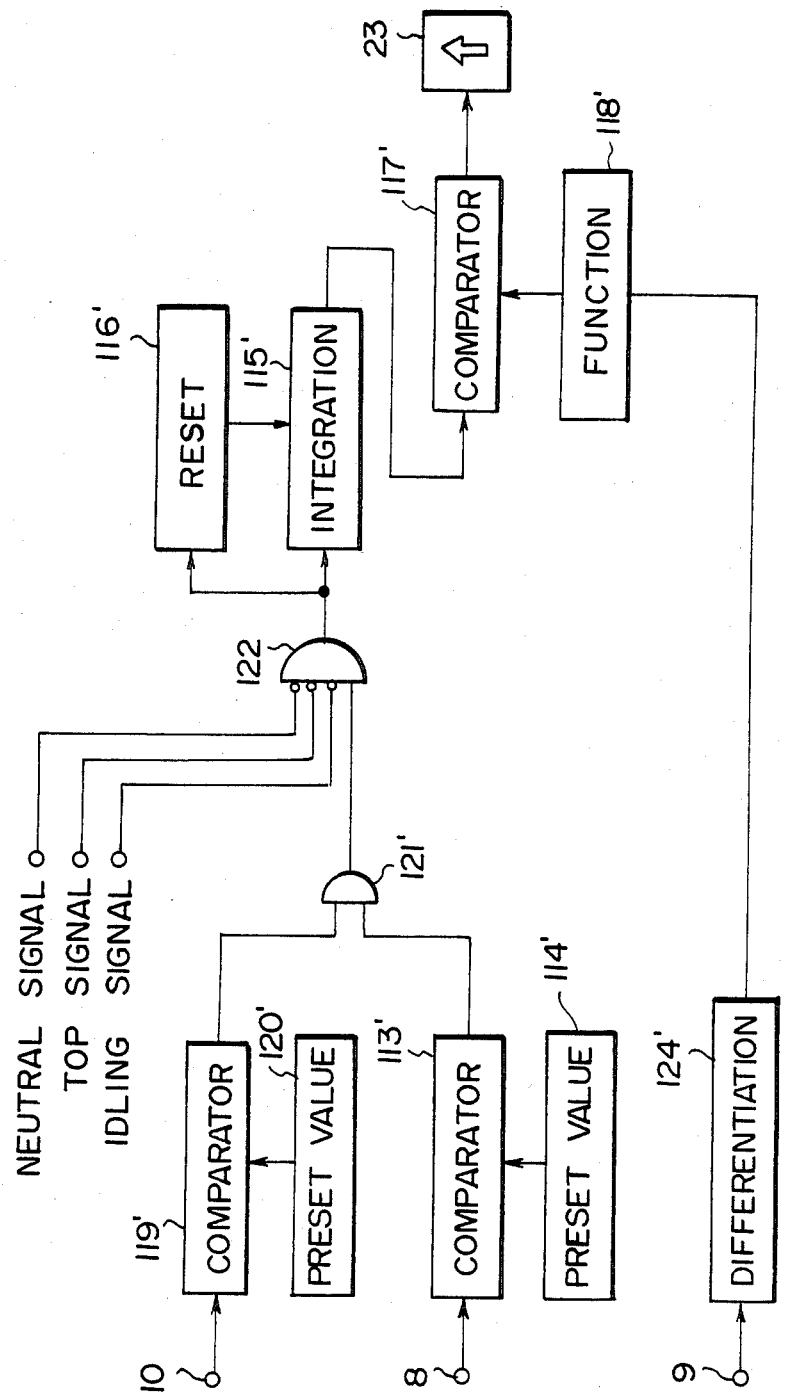
FIG. 7 is a view similar to FIG. 5 but showing a shift-up indication control circuit in accordance with a modification of the embodiment of FIG. 5.

FIG. 7 shows a shifting timing indication control circuit in accordance with a modification of that shown in FIG. 5. In this modification, engine load is detected through the opening degree of the throttle valve and acceleration of the engine is detected through the intake vacuum. The output of a rpm comparator 113' for comparing detected engine rpm with a preset value generated from a preset value generator 114' is input into an AND circuit 121' together with the output of a comparator 119' for comparing the output of the throttle opening degree detecting device 10 representing engine load with a preset value generated from a preset value generator 120'. Then the output of the AND circuit 121' is input into another AND circuit 122. Into the AND circuit 122 are further input a neutral signal, a top signal and an idling signal which are "L" when the transmission is in neutral, when the transmission is in top and when the engine is idling, and otherwise are "H". Thus, the output of the AND circuit 122 turns "H" only when the transmission is in neither neutral nor top, the engine is not idling and the operating condition is in the shift-up indication area SUA. The output of the AND circuit 120 is integrated by an integration circuit 115' and the output of the integration circuit 115' is compared by the integration value comparator 117' with a preset value generated by a function generator 118' which generates a preset value according to the output of a differentiating circuit 124' for differentiating the output of the pressure transducer 9. Also in this embodiment, the shift-up indicator light 12 is prevented from being energized for a predetermined time interval which becomes longer as the degree of acceleration is increased, after the operating condition enters the shift-up area SUA while the engine 1 is accelerated.

FIG. 8 shows the shifting timing indication control circuit for a shifting timing indicating system in accordance with still another embodiment of the present invention in which the shift-up display is restricted by increasing the preset value defining the shift-up indication area SUA. In this embodiment, the detected engine rpm is compared by a rpm comparator 213 with a preset value generated by a function generator 214 which generates a preset value according to the output of a differentiating circuit 224 for differentiating the output of the throttle opening degree detecting means 10. The output of the rpm comparator 213 is integrated by an integration circuit 215 and the output of the integration circuit 215 is compared by an integration value comparator 217 with a preset value generated from a preset value generator 218. The output of the integration value comparator 217 is input into an AND circuit 221 together with the output of an intake vacuum comparator 219 for comparing the detected intake vacuum with a preset value generated by a preset value generator 220.

We claim:

1. A shifting timing indicating system for a vehicle comprising a control means having an engine rpm detecting means for detecting the engine rpm and a rpm determination means which receives the output of the engine rpm detecting means and determines whether the engine rpm exceeds a preset value, the control means outputting a shift-up signal when the engine rpm exceeds the preset value, and a shift-up indicating means which receives the shift-up signal from the control means and makes a shift-up indication to direct the operator of the vehicle to shift up, wherein the improvement comprises an engine load detecting means for detecting the engine load; an acceleration detecting means responsive to said engine load detecting means to detect the rate of increase in engine load and restricting means responsive to said acceleration detecting means to inhibit the shift-up indicating means from making the shift-up indication when the rate of increase in engine load is greater than a predetermined positive value.

2. A shifting timing indicating system as defined in claim 1 in which said restricting means prevents said shift-up indicating means from receiving the shift-up signal for a predetermined time interval.

3. A shifting timing indicating system as defined in claim 1 in which said restricting means comprises a delay means which delays delivery of the shift-up signal to the shift-up indicating means for a predetermined time interval after the time the detected engine rpm exceeds the preset value.

4. A shifting timing indicating system as defined in claim 3 in which said predetermined time interval is extended as the rate of increase in engine load increases.

5. A shifting timing indicating system as defined in claim 4 in which said predetermined time interval is linearly extended as the rate of increase in engine load increases.

6. A shifting timing indicating system as defined in claim 1 in which said restricting means raises said preset value as the rate of increase in engine load increases.

7. A shifting timing indicating system as defined in claim 1 in which said control means further includes an engine load detecting means for detecting engine load, and a load determination means which receives the output of the engine load detecting means and determines whether the engine load is lighter than a preset value, whereby the control means outputs the shift-up signal when the engine rpm is higher than the preset value and the engine load is lighter than the preset value.

8. A shifting timing indicating system as defined in claim 7 in which said restricting means prevents said shift-up indicating means from receiving the shift-up signal for a predetermined time interval.

9. A shifting timing indicating system as defined in claim 7 in which said restricting means comprises a delay means which delays delivery of the shift-up signal to the shift-up indicating means for a predetermined time interval after the time the detected engine rpm exceeds the preset value.

10. A shifting timing indicating system as defined in claim 9 in which said predetermined time interval is extended as the rate of increase in engine load increases.

11. A shifting timing indicating system as defined in claim 7 in which said restricting means raises said preset value as the rate of increase in engine load increases.

* * * * *